(12) United States Patent
Ali et al.

(10) Patent No.: US 6,510,273 B2
(45) Date of Patent: Jan. 21, 2003

(54) OPTICAL FIBER MANAGEMENT SYSTEM

(75) Inventors: Sammy Ali, Lisle, IL (US); Igor Grois, Northbrook, IL (US); Thomas R. Marrapode, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/770,881

(22) Filed: Jan. 26, 2001

(65) Prior Publication Data

US 2002/0102089 A1 Aug. 1, 2002

(51) Int. Cl.[7] .................................................. G02B 6/00
(52) U.S. Cl. ...................... 385/136; 385/137; 385/114; 385/50; 385/84
(58) Field of Search ................................. 385/134–137, 385/88, 89, 92, 49, 65, 83, 50, 51

(56) References Cited

U.S. PATENT DOCUMENTS 5,239,609 A * 8/1993 Auteri ........................ 385/136
5,528,713 A * 6/1996 Dannoux et al. ............. 385/49

* cited by examiner

*Primary Examiner*—Hemang Sanghavi
*Assistant Examiner*—Scott Knauss
(74) *Attorney, Agent, or Firm*—A. A. Tirva

(57) ABSTRACT

A fiber management system is provided for a plurality of optical fibers which project beyond an end of a dielectric of a fiber optic cable. The system includes a support secured to the dielectric of the cable. A plurality of tubes are fixed to the support and extend away from the end of the dielectric, with the fibers positioned within the tubes.

16 Claims, 2 Drawing Sheets

OPTICAL FIBER MANAGEMENT SYSTEM

FIELD OF THE INVENTION

This invention generally relates to the art of fiber optic circuitry and, particularly, to a fiber management system for a plurality of optical fibers from a fiber optic cable or circuit.

BACKGROUND OF THE INVENTION

Fiber optic circuitry is increasingly being used in electronics systems where circuit density is ever-increasing and is difficult to provide with known electrically wired circuitry. An optical fiber circuit is formed by a plurality of optical fibers carried by a dielectric or substrate and the ends of the fibers are interconnected to various forms of connectors or other optical transmission devices. A fiber optic circuit may include a simple cable which includes a plurality of the optical fibers surrounded by an outer cladding or tubular dielectric. On the other hand, a more sophisticated optical backplane or flat fiber optic circuit is formed by a plurality of optical fibers mounted or routed on a substrate in a given pattern or circuit geometry. Optical backplanes are used to interconnect optical circuit components which transmit signals optically, as well as electrical circuit components, wiring boards, modules and/or integrated circuits. When an optical backplane interconnects electrical components, the electrical energy of each component is translated to optical energy which is transmitted by optical fibers on the optical backplane to another electrical component where it is translated back to electrical energy for transmission to the other electrical component. Optical fibers can transmit much more information than electrical conductors and with significantly less signal degradation.

In any such configurations, whether the fiber optic circuit is a simple round cable, a flat flexible circuit or an optical backplane, the individual optical fibers often extend beyond an edge or end of the dielectric or substrate whereby the individual fibers can be manipulated during termination of the fibers to various connectors or other fiber optic transmission devices. These loose fiber ends must be managed in some manner to prevent their breakage and/or entanglement. Heretofore, the fiber ends which extend away from the supporting dielectric or substrate have been attached together in a ribbon format and eventually "broken out" (separated into individual fibers) at some other location using a breakout kit. Such breakout kits have numerous disadvantages, including the fact that the kits are fairly sizable and are too large for some applications. The breakout kits also are heavy and may pull on the optical fibers if the kit is not properly supported. Still further, such breakout kits are extraneous devices that must be purchased and this significantly increases the cost of the ultimate fiber optic circuitry.

The present invention is directed to solving these various problems by providing a simple fiber management assembly which is lightweight and is attached directly to the fiber optic circuit to protect the loose fiber ends and to allow for easy manipulation and termination of the fibers.

SUMMARY OF THE INVENTION

An object, therefore, of the invention is to provide a new and improved fiber management system for a plurality of optical fibers which project beyond an edge or end of a dielectric or substrate of a fiber optic circuit, such as a flat fiber optic circuit.

In the exemplary embodiment of the invention, the system includes a support secured to the dielectric or substrate of the circuit at an edge or end thereof. A plurality of tubes are fixed to the support and extend away from the substrate. The fibers are positioned within the tubes so that the fibers are protected and are easily manipulated for terminating the fibers to connectors or other fiber optic transmission devices.

As disclosed herein, the support is fabricated of generally rigid dielectric material such as plastic or the like. The support is elongated and is secured to the substrate at opposite ends of the support outside an array of the optical fibers on the substrate. The support includes a pair of mounting posts at the opposite ends thereof, and the mounting posts extend through a pair of mounting holes in the substrate of the circuit. Locking means, such as lock washers, are engageable with the mounting posts to secure the support to the substrate. Preferably, the support is secured to the substrate substantially within a cutout in an edge of the substrate, whereby the support is located totally within the profile of the substrate.

In the preferred embodiment, the tubes which encase the fibers are flexible and are fabricated of such material as a polymer. The tubes are oversized relative to the fibers so that the fibers are loose within the tubes and can move relative to the tubes due to a differential thermal expansion and contraction between the fibers and the tubes. Providing relative movement between sections of the fibers and the substrate immediately adjacent the support also facilitates this differential in thermal expansion and contraction. The fibers may extend slightly beyond the ends of the tubes for termination to appropriate connecting devices, or the ends of the tubes may be cut-off to expose the fiber ends for termination.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
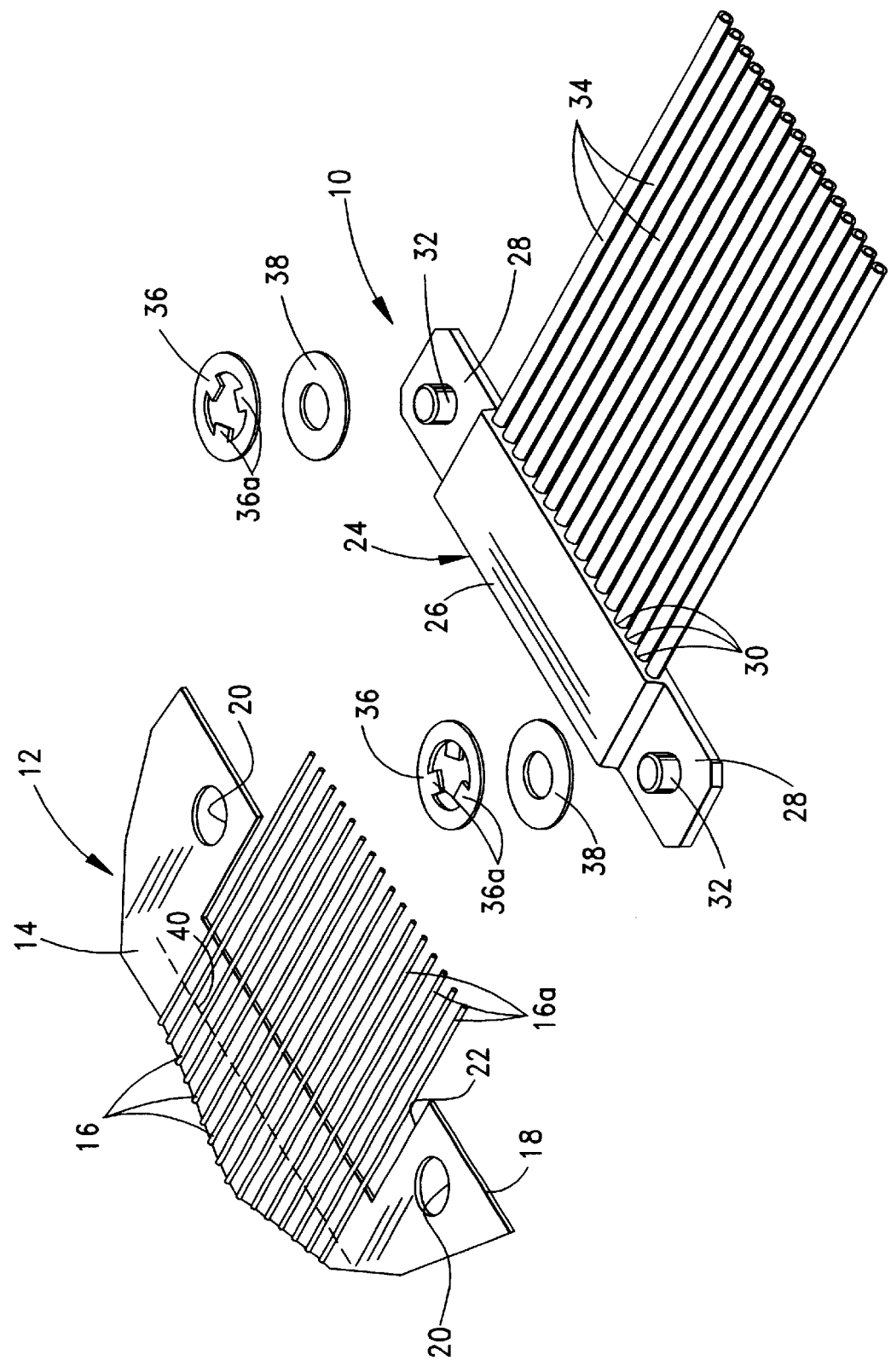
FIG. 1 is an exploded perspective view of a fiber management system or assembly according to the invention, in conjunction with a flat fiber optic circuit which has been prepared to incorporate the system or assembly.

Referring to the drawings in greater detail and first to FIG. 1, the invention is embodied in a fiber management system or assembly, generally designated 10, for use with a flat fiber optic circuit, generally designated 12. As disclosed herein, circuit 12 is a flat flexible fiber optic circuit including a flat flexible substrate 14 mounting a plurality of optical fibers 16 on one side of the substrate, with loose fiber ends 16a extending beyond an edge 18 of the substrate. However, it should be understood that a fiber management system according to the invention, including a support and a plurality of tubes as described hereinafter, also could be used for other configurations of fiber optic circuits, such as fiber optic cables which include a plurality of loose fiber ends projecting beyond an end of a dielectric.

With that understanding, fibers 16 and loose fiber ends 16a of the cable or flat circuit 12 are generally parallel to each other, as seen clearly in FIG. 1. A pair of mounting holes 20 are formed in the dielectric or flat flexible substrate 14 outside the parallel array of fibers. The fibers extend into and through a cutout 22 in edge 18 of the substrate, between mounting holes 20.

Fiber management system or assembly 10 is shown in FIG. 1 to include an elongated support, generally designated 24, which includes an elongated central body portion 26 and opposite end wing portions 28. A plurality of parallel holes 30 extend through central body portion 26, and a pair of mounting posts 32 project upwardly from end wing portions 28. The entire support 24, including central body portion 26, end wing portions 28 and mounting posts 32, may be fabricated as a one-piece structure of generally rigid dielectric material such as molded plastic or the like.

Still referring to FIG. 1, fiber management assembly 10 includes a plurality of tubes 34 which are inserted into holes 30 in central body portion 26 of support 24. The tubes are fixed to the support by appropriate adhesive about the tubes within holes 30. The tubes are flexible and are fabricated of such material as Teflon. For purposes described hereinafter, the inside diameters of the tubes are greater than the diameters of optical fiber ends 16a.

FIG. 1 also shows a pair of lock washers 36 and a pair of flat, round washers 38 which are used to secure support 24 to substrate 14 of flat circuit 12. Washers 38 may be fabricated of plastic material, and lock washers 36 may be fabricated of metal material including interior locking tangs 36a which will dig into the plastic material of mounting posts 32, as described hereinafter.

Figure 2:
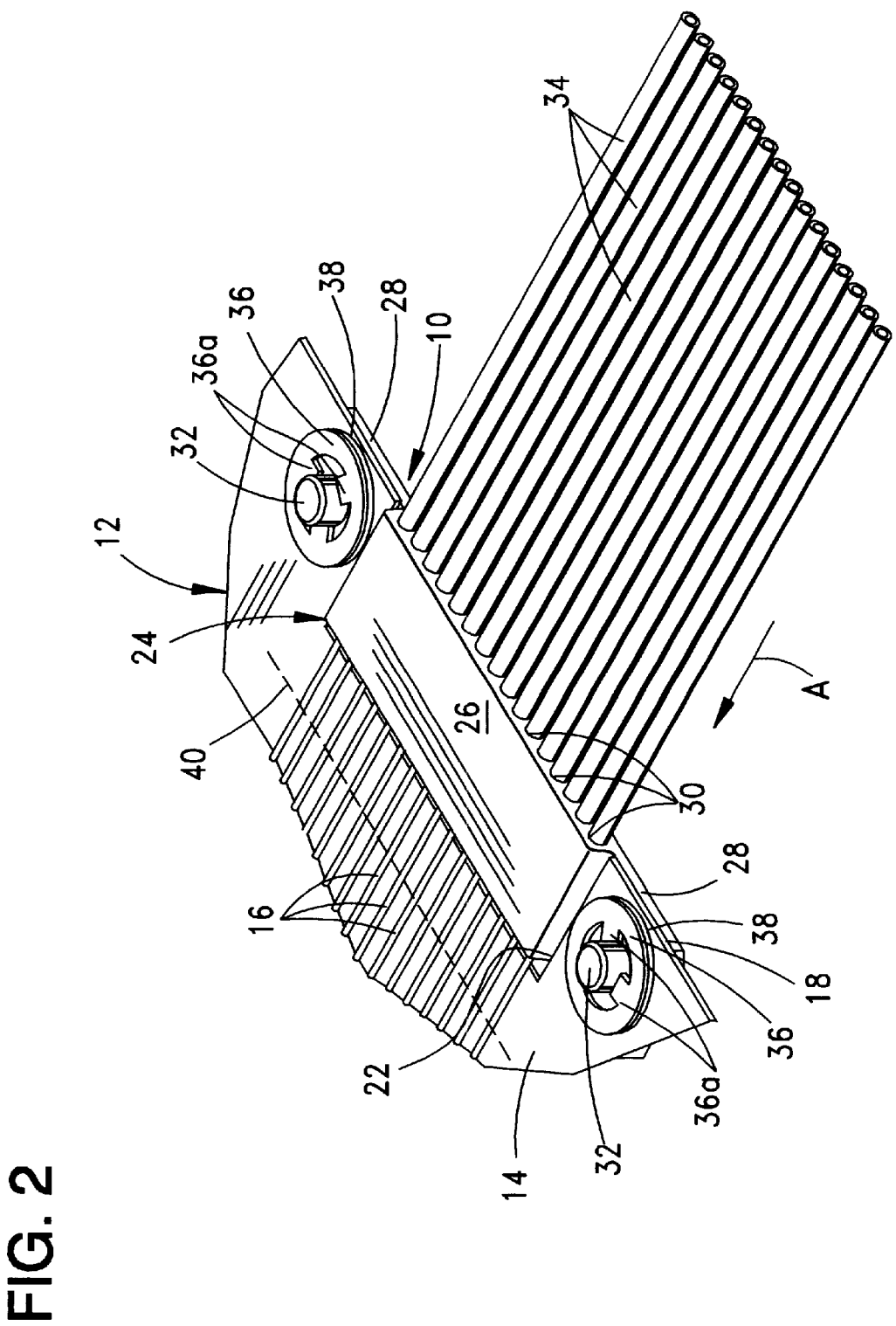
FIG. 2 is a perspective view of the fiber management assembly operatively secured to the flat fiber optic circuit.

FIG. 2 shows how fiber management system or assembly 10 is assembled to flat fiber optic circuit 12 to protect fiber ends 16a (FIG. 1) and to allow easy manipulation and termination of the individual fibers. In particular, the assembly of support 24, with tubes 34 fixed thereto, is assembled to the cable or circuit 12 in the direction of arrow "A". During assembly, fiber ends 16a are threaded into holes 30 in central body portion 26 of the support and into tubes 34. The support is moved in the direction of arrow "A" until body portion 26 is fully positioned within cutout 22 in substrate 14. Therefore, support 24 is positioned at least flush with edge 18 of substrate 14, i.e. within the overall profile of the substrate. Flexible substrate 14 is manipulated so that mounting holes 20 (FIG. 1) embrace mounting posts 32 as shown in FIG. 2. Round washers 38 and lock washers 36 then are positioned over mounting posts 32 to lock support 24 to substrate 14, as tangs 36a of the lock washers bite into the periphery of the mounting posts.

As stated above, the inside diameters of tubes 34 are larger than the diameters of fiber ends 16a. Therefore, the fibers are loose within the tubes and can move relative thereto. In other words, the fibers float within the tubes to accommodate different thermal expansions and contractions between the tubes and the fibers which are fabricated of different materials. The fibers may be of glass material.

The invention contemplates that the fibers float relative to substrate 14 of circuit 12 for a given distance behind body portion 26 of support 24. In other words, sections of the fibers are not adhered to the substrate adjacent the support. In the drawings, dotted line 40 represents a given distance (e.g. one or two inches) behind body portion 26 of support 24. The fibers are not adhered to substrate 14 between line 40 and the support. This allows the fibers to move relative to the substrate and to further accommodate differences in thermal expansion and contraction between the glass fibers and the other components of the system. In essence, the fibers run freely through body portion 26 and tubes 34.

When the fiber management system of the invention is secured to fiber optic circuit 12 as shown in FIG. 2, fiber ends 16a (FIG. 1) are completely protected inside tubes 34. In addition, the tubes prevent entanglement of the loose fiber ends. When it is desired to terminate one or more of the fiber ends to appropriate connectors or other fiber optic transmission devices, the respective tubes can be cut-off to expose desired lengths of the fiber ends sufficient for termination. Although not shown in the drawings, the fiber ends alternatively may project slightly beyond the open distal ends of the tubes for termination purposes.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fiber management system for a plurality of optical fibers of a flat fiber optic cable, the flat fiber optic cable including a flat substrate having an edge beyond which the optical fibers project, comprising:
   a support secured to the substrate of the cable along said edge thereof; and
   a plurality of tubes fixed to the support and extending away from the substrate with the fibers positioned within the tubes.

2. The fiber management system of claim 1 wherein said support is fabricated of rigid dielectric material.

3. The fiber management system of claim 2 wherein said support is elongated and is secured to the substrate at opposite ends of the support outside an array of the optical fibers on the substrate.

4. The fiber management system of claim 3 wherein said support includes a pair of mounting posts at said opposite ends thereof, the mounting posts extending through a pair of mounting holes in the substrate of the cable.

5. The fiber management system of claim 4, including locking means engageable with said mounting posts extending through the mounting holes to secure the support to the substrate.

6. The fiber management system of claim 1 wherein said support is fabricated of rigid dielectric material.

7. The fiber management system of claim 1 wherein said tubes are flexible.

8. The fiber management system of claim 1 wherein said tubes are larger than the fibers so that the fibers are loose within the tubes.

9. The fiber management system of claim 8 wherein said tubes are flexible.

10. A fiber management system, comprising:
   a flat fiber optic circuit including a flat substrate having a cutout in an edge thereof, and a plurality of optical fibers supported on the substrate, the fibers extending into the cutout and projecting beyond the edge of the substrate;
   a rigid dielectric support secured to the substrate of the circuit and positioned within said cutout thereof; and
   a plurality of flexible tubes fixed to the support and extending away from the substrate with the fibers positioned therewithin, the tubes being sized larger than the fibers so that the fibers are loose within the tubes.

11. The fiber management system of claim 10 wherein said support is elongated and is secured to the substrate at opposite ends of the support outside an array of the optical fibers on the substrate.

12. The fiber management system of claim 11 wherein said support includes a pair of mounting posts at said opposite ends thereof, the mounting posts extending through a pair of mounting holes in the substrate of the circuit.

13. The fiber management system of claim 12, including locking means engageable with said mounting posts extending through the mounting holes to secure the support to the substrate.

14. A fiber management system of claim 10 wherein the fibers extend freely through said support into the tubes.

15. A fiber management system of claim 14 wherein the fibers are loose relative to the substrate for a given distance behind the support.

16. A fiber management system for a plurality of optical fibers which project beyond an edge of a substrate of a flat fiber optic circuit, comprising:
 a support secured to the substrate of the circuit substantially within a cutout in said edge of the substrate; and
 a plurality of tubes fixed to the support and extending away from the substrate with the fibers positioned within the tubes.

* * * * *